United States Patent Office 3,553,544
Patented Jan. 5, 1971

3,553,544
STACKED CAPACITOR
Henry F. Puppolo, North Adams, and Mark Markarian, Williamstown, Mass., assignors to Sprague Electric Company, North Adams, Mass., a corporation of Massachusetts
Filed Sept. 16, 1969, Ser. No. 858,487
Int. Cl. H01g 1/01, 1/08
U.S. Cl. 317—258
4 Claims

ABSTRACT OF THE DISCLOSURE

T-shaped planar electrodes are stacked in a capacitor unit with interposed dielectric spacers. Alternate electrodes are reversed and oppositely disposed in the stack such that their T-wings are laterally spaced and longitudinally extended at the ends of the unit, permitting direct connection to a heavy feed-thru terminal located mid-way in the stack within each of the T-wings and running its length.

BACKGROUND OF THE INVENTION

This invention relates to flat stacked capacitors, and more particularly to such capacitors having large current carrying capabilities.

Capacitors dealing with high frequency functions have presented problems to prior electronic design and usage. High frequency operations demand lower impedance across a capacitor unit. Such a provision, however, causes an increase in the power dissipation requirements of the capacitor, which, unless satisfied, leads to burned out and ruined units.

An object of the present invention is the provision of a flat stacked capacitor in which the resistance and inductance of the capacitor are lowered so as to yield less impedance across it and allow for effective high frequency operation. Another object is the provision of a superior means of dissipating the heat resulting from increased power requirements in a flat stacked capacitor.

It is therefore an additional object of the present invention to provide a capacitor capable of reliable high frequency operation. Another object is the provision of a capacitor with a large current carrying capacity and improved means of heat dissipation. Another object is the provision of an improved welding connection between capacitor electrodes and terminal means.

SUMMARY OF THE INVENTION

A flat stacked capacitor in accordance with the present invention includes at least two pairs of electrodes separated by dielectric spacer material, each of said electrodes being T-shaped and stacked in alternate directions such that direct connection may be made to a pair of feed-thru terminals located substantially mid-way in the stack running its full length and centered on its T-wings. Locating the terminal bars in the middle of the stack provides a high degree of symmetry found to be of value in high frequency operation.

DESCRIPTION OF THE PREFERRED EMBODIMENTS

Figure 1:
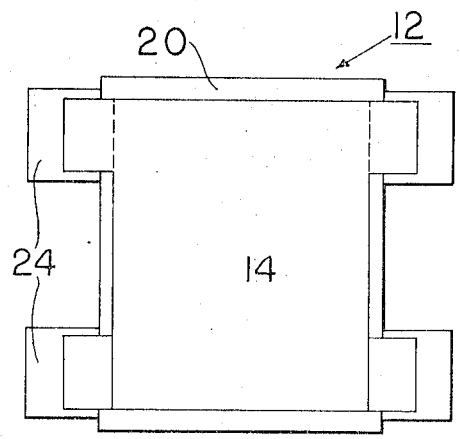
FIG. 1 is a plan view of a flat capacitor stack in accordance with the present invention.

FIG. 1 illustrates the essence of the present invention. A capacitor stack 12 is made up of T-shaped electrodes 14 with spacers 20 of dielectric material interposed between the electrodes 14. These electrodes 14 are arranged in alternately opposite directions with a pair of feed-thru terminals 24 running through the middle of stack 12 and centered in the T-wings of the stack that are formed by alternation of electrodes 14. These terminals 24 are wider than the T-wings of electrodes 14 and this larger surface area insures a more complete welding connection between terminals 24 and electrodes 14.

Figure 2:
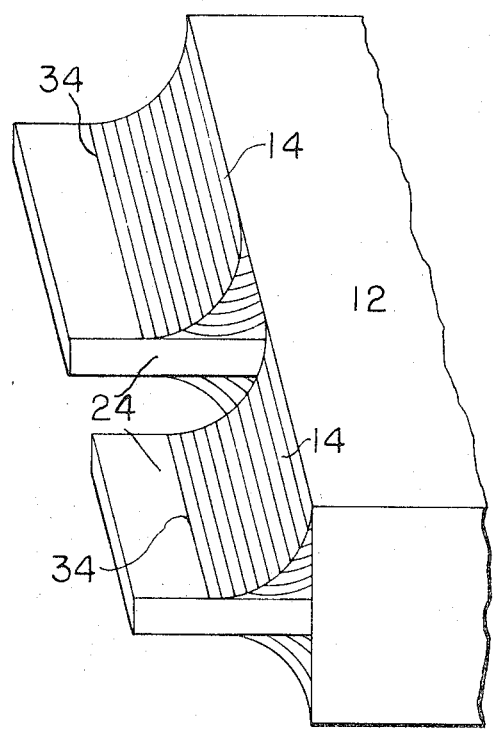
FIG. 2 is a partial side view in perspective of the capacitor stack of FIG. 1.

FIG. 2 shows a plurality of electrodes 14 provided with an inert gas weld connection 34 to the feed-thru terminals 24 of capacitor stack 12. All the electrodes 14 are connected to the terminals 24 by welds 34 either directly to the terminals or to electrodes already welded to them. By welding both ends of the T-wings to the terminal bars, the resistance of the stack is reduced and the current carrying and heat dissipation abilities of the capacitor are enhanced. The dielectric spacer material 20 is not present in the area at the ends of the T-wings where the weld connection 34 is made.

In the preferred embodiment of the invention, a TIG (tungsten-inert gas) weld 34 connects the electrodes 14 to the reed-thru terminals 24. The electrodes 14 and the feed-thru terminals 24 are made of high purity (99% or higher) aluminum, which tends to eliminate problems of corrosion and insures the formation of high quality aluminum oxide films. The dielectric spacer material utilized is 0.0012 inch Manila paper. Further, the feed-thru terminals are relatively thick (64 mils) compared to the aluminum anode and cathode foils (2 to 3 mils) and serve to conduct heat rapidly away from the capacitor stack allowing high frequency operation, without such operation's attendant disadvantages.

Figure 3:
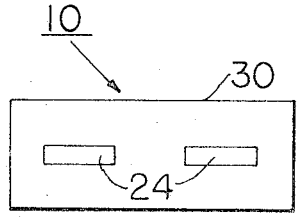
FIG. 3 is an end view of the completed capacitor of the present invention.
Figure 4:
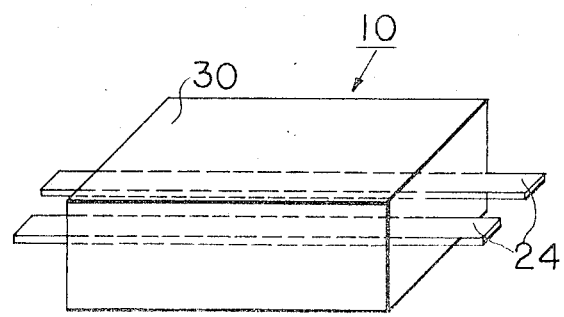
FIG. 4 is a pictorial view of the completed capacitor of the present invention.

The completed capacitor 10 is illustrated by end and perspective views in FIGS. 3 and 4. The capacitor stack 12 of foils and spacers is impounded in a block of wax and sealed in a resinous casing 30 to allow its most efficient operability. A small rubber venting means is preferably provided in the casing 30. It can be seen that feed-thru terminals 24 are placed in the middle of capacitor stack 12, that they run the length of capacitor 10 and project through the resin coating 30 to make external contacts, and that they are centered in the T-wings of the capacitor electrodes 14. Placing the terminals 24 substantially at the mid-point in the thickness of the stack provides greater transfer of heat from the capacitor, and also provides a symmetrical structure for high frequency operation. Also the location and width of terminals 24 facilitates welding of half the foil extensions to each side of the terminals.

Because of their size and purity, the feed-thru terminals provide excellent paths of conduction for the capacitor, resulting in greater current carrying capabilities. This lesser thru-resistance on the terminal results in a lower effective series resistance for the entire capacitor. Further, the inductance properties in this type of stacked construction are significantly improved. All of which results in lower impedance which permits effective high frequency operation.

The capacitors under consideration have a large capacitance value. One electrolytic capacitor, for example, having 75 etched and anodized ("formed") foil anodes (3 mils) and 76 etched foil cathodes (2 mils) each having T-wings of 6" x 1¾" attached to body portions of 3" x 2¼" provides a capacitance of 130,000 microfarads at 5 volts. This size results in a large and rapid accumulation of internal heat which previously has hindered high frequency development. The feed-thru terminals are 8" x 2" and 64 mils thick, and because of their good conductivity, thickness and decreased resistance serve to dissipate this heat build-up quickly, allowing high frequency operation to proceed without interference.

What is claimed is:

1. A flat stacked capacitor comprising a plurality of planar electrodes in a stacked arrangement with interposed spacers of dielectric material, said electrodes being T-shaped and being stacked alternately at 180° angles to provide longitudinally extended and laterally spaced T-wings extending from the ends of the capacitor unit, said unit having a pair of feed-thru terminals running its length, said terminals being located substantially mid-way in the stack and centered on said T-wings, said electrodes being welded at both ends of said T-wings to said terminals.

2. The capacitor of claim 1 wherein said electrodes are etched and the electrodes disposed to one side of said unit are formed.

3. The capacitor of claim 2 wherein said electrodes are high purity aluminum, said electrodes disposed to one side have an aluminum oxide formation, and said terminals are thick high purity aluminum.

4. The capacitor of claim 1 wherein the capacitor is encased in a wax compound and being covered by a resinous casing having venting means.

References Cited
UNITED STATES PATENTS 2,878,433   3/1959   Beresford _____ 317—261

ELLIOT A. GOLDBERG, Primary Examiner

U.S. Cl. X.R.

317—230, 243, 247, 261